US 8,857,746 B2

(12) United States Patent
Shuttleworth et al.

(10) Patent No.: US 8,857,746 B2
(45) Date of Patent: Oct. 14, 2014

(54) PROCESS FOR IMPROVING THE QUALITY OF SEPARATED MATERIALS IN THE SCRAP METAL INDUSTRY

(75) Inventors: Timothy G. Shuttleworth, Girard, PA (US); Xinkai Jiang, Fairview, PA (US)

(73) Assignee: Eriez Manufacturing Co., Erie, PA (US)

( * ) Notice: Subject to any disclaimer, the term of this patent is extended or adjusted under 35 U.S.C. 154(b) by 435 days.

(21) Appl. No.: 13/292,182

(22) Filed: Nov. 9, 2011

(65) Prior Publication Data

US 2012/0111977 A1    May 10, 2012

Related U.S. Application Data

(60) Provisional application No. 61/411,735, filed on Nov. 9, 2010, provisional application No. 61/416,813, filed on Nov. 24, 2010, provisional application No. 61/525,902, filed on Aug. 22, 2011.

(51) Int. Cl.
| | |
|---|---|
| *B02C 23/14* | (2006.01) |
| *B03C 1/18* | (2006.01) |
| *B03C 1/30* | (2006.01) |
| *B03C 1/247* | (2006.01) |
| *B03B 9/06* | (2006.01) |
| *C22B 1/00* | (2006.01) |

(52) U.S. Cl.
CPC . *B03B 9/061* (2013.01); *B03C 1/18* (2013.01); *B03C 1/30* (2013.01); *B03C 2201/20* (2013.01); *B03C 1/247* (2013.01); *C22B 1/005* (2013.01)
USPC .............................. 241/19; 241/24.14; 241/29

(58) Field of Classification Search
USPC ............... 209/12.1; 241/19, 24.14, 24.13, 79, 241/79.1, 29
See application file for complete search history.

(56) References Cited

U.S. PATENT DOCUMENTS

| | | | |
|---|---|---|---|
| 3,335,968 A | 8/1967 | Young | 241/35 |
| 3,672,496 A | 6/1972 | Williams | 209/38 |
| 3,901,795 A | 8/1975 | Smith et al. | 209/39 |
| 3,926,792 A | 12/1975 | Buford | 209/215 |
| 3,973,736 A | 8/1976 | Nilsson | 241/76 |
| 4,125,191 A | 11/1978 | Peace | 209/609 |
| 4,139,454 A | 2/1979 | Larson | 209/12 |

(Continued)

FOREIGN PATENT DOCUMENTS

| | | |
|---|---|---|
| DE | EP 0462502 | 12/1991 |
| DE | 44 42 631 | 6/1996 |

(Continued)

*Primary Examiner* — Mark Rosenbaum
(74) *Attorney, Agent, or Firm* — Jonathan M. D'Silva; David S. Willoughby; MacDonald, Illig, Jones & Britton LLP (57) ABSTRACT

What is presented is a process for scrap metal processing for shredding and sorting recoverable material from a material stream that comprises a ferrous fraction, a non-ferrous fraction, a waste fraction and a less ferrous fraction that includes composite materials. The process comprises first shredding the material stream with a first shredder to a size that enables downstream processing. The shredded material stream is then conveyed to at least one drum separator to remove the non-ferrous fraction from the material stream and then conveyed to a first conveyor separator to further separate the ferrous fraction from the material stream. At the completion of these steps the remaining material stream to be handled by downstream processes represents 10% to 40% of the original material stream as compared to 70% to 75% of the material stream in the prior art.

15 Claims, 2 Drawing Sheets

(56) References Cited

U.S. PATENT DOCUMENTS

| | | | |
|---|---|---|---|
| 4,273,646 A | 6/1981 | Spodig | 209/223 |
| 4,686,034 A | 8/1987 | Barrett | 209/223.1 |
| 4,738,367 A | 4/1988 | Barrett | 209/223.1 |
| 4,834,870 A | 5/1989 | Osterberg et al. | 209/38 |
| 4,883,584 A | 11/1989 | Sattler et al. | 209/38 |
| 5,333,797 A | 8/1994 | Becker et al. | 241/19 |
| 5,465,847 A | 11/1995 | Gilmore | 209/12.1 |
| 6,318,558 B1 | 11/2001 | Exner | 209/2 |
| 2001/0048039 A1 | 12/2001 | Simon et al. | 241/20 |
| 2002/0104784 A1 | 8/2002 | Wise | 209/226 |
| 2002/0144934 A1 | 10/2002 | Exner | 209/226 |
| 2006/0102524 A1 | 5/2006 | DeFeraudy | 209/30 |
| 2008/0105771 A1 | 5/2008 | Simon | 241/22 |
| 2009/0159511 A1 | 6/2009 | Molteni | 209/636 |
| 2011/0240528 A1 | 10/2011 | Ruiz | 209/38 |

FOREIGN PATENT DOCUMENTS

| | | |
|---|---|---|
| DE | 20312378 | 10/2003 |
| GB | 1 530 065 | 10/1978 |
| WO | WO 01/03844 | 1/2001 |
| WO | WO 02/40171 | 5/2002 |

PROCESS FOR IMPROVING THE QUALITY OF SEPARATED MATERIALS IN THE SCRAP METAL INDUSTRY

This application takes priority from U.S. Provisional Patent Application No. 61/411,735 filed on Nov. 9, 2010, U.S. Provisional Patent Application 61/416,813 filed on Nov. 24, 2010, U.S. Provisional Patent Application 61/525,902 filed on Aug. 22, 2011, all of which are hereby incorporated by reference.

BACKGROUND

Scrap metal processing currently typically involves the use of large pieces of equipment to shred and bulk sort recoverable material followed by a tedious labor intensive hand sorting of the final product. The final products are generally of a comparatively low grade of product unless the operator takes pains to control the feed content of the scrap processed. What is presented is a process for scrap metal processing to achieve greater recovery and a better grade of finished products for both ferrous and non-ferrous materials with less valuable metal lost to the final waste streams. Furthermore, the invention eliminates significant capital equipment and operating costs compared to the prior art allowing for savings for the operator.

SUMMARY

What is presented is a process for scrap metal processing for shredding and sorting recoverable material from a material stream that comprises a ferrous fraction, a non-ferrous fraction, a waste fraction and a less ferrous fraction that includes composite materials. The process comprises first shredding the material stream with a first shredder to a size that enables downstream separation processing. The shredded material stream is conveyed to at least one drum separator to remove the non-ferrous fraction from the material stream and then conveyed to a first conveyor separator to further separate the ferrous fraction from the material stream. At the completion of these steps the remaining material stream to be handled by downstream processes represents 10% to 40% of the original material stream as compared to 70% to 75% of the material stream in the prior art.

In the preferred embodiment the process conveys the remaining material stream from the first conveyor separator to a hand sorting stage to sort the remaining material stream into its remaining comprising component fractions. Alternatively, the remaining material stream from the first conveyor separator could be further shredded with a second shredder and returned to the drum separator earlier in the process for reprocessing. In another embodiment the remaining material stream from the first conveyor separator is stockpiled and later returned to the first conveyor separator for reprocessing at different machine settings. In another embodiment the remaining material stream from the first conveyor separator is conveyed to an automated sorter for preliminary sorting of the remaining material stream before being conveyed to a hand sorting stage to sort the remaining material stream into its comprising component fractions.

In applications in which the first shredder produces a broad range of sizes of shredded material, for example when a shredder performs poorly or by design, the remaining material stream from the first conveyor separator is conveyed to second smaller conveyor separator to further separate the non-ferrous fraction from the material stream. The remaining ferrous fraction and composite fraction in the material stream from the second conveyor is then conveyed to a hand sorting stage to sort the remaining material stream into its remaining comprising component fractions.

The first conveyor separator in every embodiment may be a pulley separator, a pulley drum separator or a dynamic drum pulley separator. In the embodiments that have a second conveyor separator, the second conveyor separator may be a pulley separator, a pulley drum separator, or a dynamic drum pulley separator. The drum separators in each embodiment described comprise rare-earth permanent magnets, electromagnets, or electro-permanent magnets. In various embodiments, material detectors can be used to adjust the output sensitivity of the first conveyor separator. In embodiments in which the material stream is hand sorted, the separated composite fraction of the remaining material stream can be further processed with a second shredder and reprocessed to separate the ferrous portion from the non-ferrous portion from the composite materials.

Those skilled in the art will realize that this invention is capable of embodiments that are different from those shown and that details of the devices and methods can be changed in various manners without departing from the scope of this invention. Accordingly, the drawings and descriptions are to be regarded as including such equivalent embodiments as do not depart from the spirit and scope of this invention.

BRIEF DESCRIPTION OF DRAWINGS

For a more complete understanding and appreciation of this invention, and its many advantages, reference will be made to the following detailed description taken in conjunction with the accompanying drawings.

DETAILED DESCRIPTION

Referring to the drawings, some of the reference numerals are used to designate the same or corresponding parts through several of the embodiments and figures shown and described. Corresponding parts are denoted in different embodiments with the addition of lowercase letters. Variations of corresponding parts in form or function that are depicted in the figures are described. It will be understood that variations in the embodiments can generally be interchanged without deviating from the invention.

Figure 1:
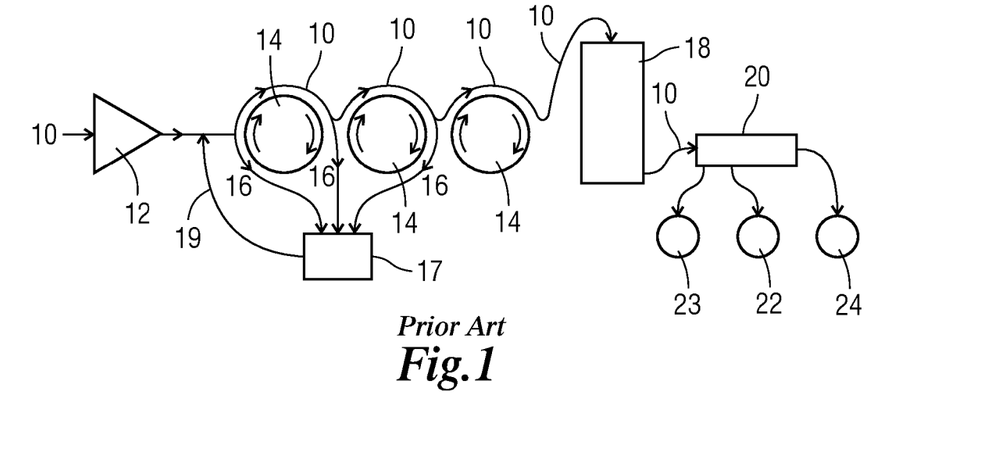
FIG. 1 depicts a flow chart showing how scrap metal processing is conducted in the prior art.

Scrap metal processing is a bulk processing operation that is machine intensive and portions of the process are currently very labor intensive. FIG. 1 shows a flow chart that represents this process. The material stream 10 to be processed is first run through a large shredder 12 that grinds, shreds, tears, or otherwise breaks the material down to a more manageable size for downstream processes. The process of shredding also causes objects that are composites of different materials to break up. For example, when a scrap metal operation processes a large item, such as an automobile or other large contraption, for recycling, the item includes a number of parts with combinations of different types of metals, including iron, copper, and aluminum, among others in, for example, copper wiring wrapped within steel housings, aluminum drums with steel pistons, steel bolts on an aluminum frame, etc. The shredder 12 breaks up much of the item into smaller chunks with the aim of separating as much of the combinations of materials as possible. The goal of the process is to separate and recover the various metal fractions that can be sold and reprocessed by metal processors. Obtaining as pure a metal fraction as possible allows the scrap metal processor to demand better prices for each recovered metal fraction.4

The magnetic metal fraction of the material stream 10 is predominantly composed of iron based ferrous materials which can be melted down for steel. The non-magnetic and non-ferrous fraction of the material stream 10 comprises rubber, plastics, aluminum, etc. Much of these items are also valuable for recycling. The shredded material stream 10 also comprises composite materials that are inseparably combined combinations of non-ferrous metals with ferrous metals, for example coiled copper wire in a steel alternator or steel bolts on an aluminum frame, that for whatever reason were not liberated in the shredding step. The magnetic portion of the composite material will be picked up by the various magnetic sorters with varying degrees of effectiveness depending on the strength of the magnets used and the machine settings of the various sorters. These composite materials often represent the component with the greatest degree of error in the recycling system. Inevitably, the material stream 10 also includes some amount of waste material that slips through the process.

As shown in FIG. 1, the shredded material stream 10 is conveyed to a single or a series of drum separators 14 to remove the ferrous fraction from the material stream. Drum separators 14 typically consist of an outer shell that is rotated by a drive mechanism (not shown) around a number of magnetic elements that are housed within the outer shell. The drum separators 14 are rotated relative to the material stream 10 in the direction indicated by the arrows in FIG. 1. As described above, the material stream 10 to be sorted comprises a mixture of ferrous, non-ferrous, and composite materials. The material stream 10 is presented to the rotating drum separator 14 using any appropriate transfer system such as vibrating feeders, conveyors, chutes, etc. The magnetic elements in the ferrous fraction and the composite fraction of the material stream 10 are magnetically attracted to the magnets within the drum separators 14. The drum separators 14 have a series of cleats (not shown) that assist the movement of the magnetic material in the material stream 10 along the rotation axis of the drum separator 14 and discharges it onto any appropriate transfer system (not shown) such as conveyors, chutes, vibrating feeders, etc. as demanded by the specific application. The non-magnetic and non-ferrous materials in the removed material stream 16 are discharged out of the system for further processing and separation of valuable non-ferrous metals. This includes non-magnetic waste materials and some composite materials that have insufficient ferrous materials to be captured by the drum separator 14.

The number of drum separators varies from installation to installation, with most installations having two drum separators and some having one or three. The number varies according to the strength of the magnets in the drum separators 14 and the specific need for separation of the ferrous fraction from the material stream 10 at each facility. It is generally understood that more drum separators 14 provide for an end product that has a higher fraction of ferrous products because there are more opportunities for the non-ferrous fraction to be dropped out of the system. However, with less powerful drum separators 14 this also leads to more losses of ferrous or composite material into the non-ferrous removed material stream 16 because less powerful drum separators 14 are more likely to miss less-ferrous materials or composites. This reduces the potential recovery of ferrous material and also contaminates the non-ferrous products later separated from this non-magnetic material stream 16. Drum separators 14 with stronger magnets are more likely to capture more of the ferrous and composite fractions from the material stream 10 in a single pass but are also more likely to also capture composite materials that have a larger percentage of combined non-ferrous materials. In some facilities, the first drum separator 14 picks up non-ferrous materials along with the ferrous material in the material stream 10 in which case the second or third drum separator is used to further separate the non-ferrous material out. In either case multiple drum separators are not seen in every application. The drum separator 14 step in the process is likely to remove about 25% to 30% of the material from the material stream 10 which is represented by the removed material stream 16.

While most of the material in the removed material stream 16 is likely to be non-ferrous and non-magnetic material, some ferrous material will always be lost due to many causes. Most processing plants will include a scavenger magnet 17 to recover some of this lost ferrous material 19 which is returned to the drum separators 14 for processing. Some processing plants require several scavenger magnets 17 due to the poor efficiency of their drum separators 14.

Drum separators come in a variety of dimensions, but generally range from 48 inches to 108 inches wide with diameters of 36 inches to 72 inches. These systems typically process several hundred tons of raw materials a day and even several hundred tons per hour depending on the size of the facility and the size of the equipment. In general, most drum separators in the prior art are those that use ceramic magnets or electro magnets that generate magnetic fields in the range of 3 MGOe (mega gauss oersteds) to 10 MGOe. Stronger drum separators, like the P-Rex®, Permanent Rare Earth Xtreme™ Drum Magnet, manufactured by Eriez Manufacturing Co., use rare earth permanent magnets that generate magnetic fields upwards of 35 MGOe.

In many applications, the material stream is then conveyed on through an air cleaning tower 18 in which the material stream is dropped from the top of the air cleaning tower 18 with high pressure air forced up the opposite direction to further clean and remove dust particles and light matter from the material stream. This step is not used in every application as the dust may be removed by further downstream processing of the material stream, but it provides benefits to those plants that have problems with dust buildup or are not interested in collecting and processing fine metal dust. The dust removed during this step represents a tiny portion of the overall material stream 10 and the amount that passes onto the next step is essentially unchanged at 70% to 75% of the original volume of material. Generally a third drum separation 14 is not used in systems that have air cleaning towers 18, but this is shown in FIG. 1 for purposes of illustration only.

The outflow from the air cleaning tower 18 is then conveyed to the most labor intensive part of the process in which the material stream is hand sorted 20 to remove those components of the material stream 10 that comprise the composite pieces 22 of ferrous and non-ferrous materials, which may include other valuable salvageable material, or simply waste 23 to be removed. The remainder of the material stream 10 should comprise a high fraction of ferrous materials 24 only, which is generally the target end product of scrap metal processing. The hand sorted composite materials 22 are either further shred to separate the ferrous and non-ferrous fraction and further processed or are sold as a product or, if no market exists, are discarded.

This hand sorting 20 step is the most prone to error. Depending on the process rate of the drum separators 14, the hand sorting 20 step is often split up amongst several parallel banks of conveyors each manned by groups of sorters so that the sorting may be conducted at a manageable speed for hand sorting. Hand sorting 20 requires the processing of 70% to 75% of the original material stream 10. The errors in hand sorting 20 directly impact the quality of the final ferrous materials 24 product.

The improved process presented improves the efficiency of the separation process and reduces the reliance on hand sorting. A basic outline of the process is presented in FIG. 2. As with the prior art, the material stream to be processed 10a is first run through a large shredder 12a that grinds, shreds, tears, or otherwise breaks the material down to a more manageable size. The shredded material stream 10a is conveyed to at least one drum separator 14a to remove the ferrous fraction from the material stream. The non-magnetic and non-ferrous materials in the removed material stream 16a are discharged out of the system for further processing and separation of valuable non-ferrous metals.

Figure 2:
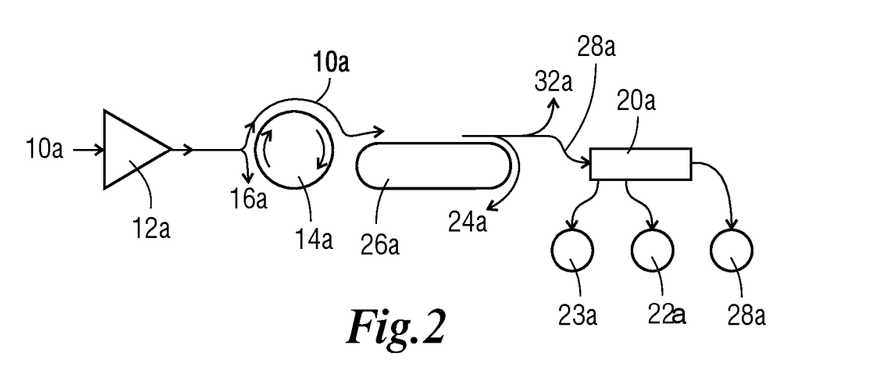
FIG. 2 is a flow chart showing how scrap metal processing is conducted according to the preferred embodiment of the invention disclosed herein.

While all drum separator configurations can benefit from the improved process described herein, drum separators 14a that are equipped with technologies that generate larger magnetic fields will see the most benefit. More powerful magnetic fields tend to pick up much more composite materials which results in a removed material stream 16a that would otherwise have greater losses of ferrous materials and composite materials. Downstream non-ferrous separation processes (not discussed herein) generally cannot separate composite materials very well. Composite materials can also damage downstream non-ferrous separation processes so their elimination from the removed material stream 16a has additional benefits to the scrap processing system.

More powerful drum separators 14a combined with a conveyor separator 26a as disclosed herein also tend to not require a sequence of drums to be effective. This is because the immediate downstream processes described herein are more capable cleaning/sorting processes which lessens the need for multiple drums to accomplish the cleaning. This also eliminates the associated losses of ferrous matter at each secondary drum. A further consequence of using drum separators 14a with stronger magnetic fields is that there is less of a need for scavenger magnets because less ferrous material is lost to the removed material stream 16a. Therefore the capital and operating costs for using and maintaining such scavenger magnet equipment can be eliminated. Between 70% and 75% of the material stream 10a is conveyed from the drum separators 14a onto the next step.

The material stream 10a discharged from the drum separator 14a is sent to a conveyor separator 26a for further processing. The conveyor separator 26a may be a pulley separator, a pulley drum separator, or a dynamic drum pulley separator. In any case the material stream 10a is placed on a variable speed conveyor belt. The far end of the conveyor belt rotates around a shaft that houses a series of magnets that are arranged either axially or radially on the shaft. In a pulley separator, the magnets rotate in lock step with the belt surface in the direction of the flow of material. In a pulley drum separator, the magnets are fixed within a drum around the shaft, however a non-magnetic shell rotates over the fixed magnet arrangements. The key feature of pulley drum separators is the magnets are fixed and do not move as the conveyor belt moves the material around the shaft. A dynamic drum pulley separator is a combination of the other two schemes. The magnets are housed within a drum that may rotate the magnets at a different speed and/or different direction relative to the conveyor belt. Generally dynamic drum pulley separators are set so that the magnets rotate in the same direction but at a slower speed than the conveyor belt.

No matter which type of conveyor separator 26a is used, as the material stream passes over the far end of the conveyor separator 26a, the less-ferrous middling material 28a, and/or composite material that does not contain enough magnetic material, is thrown off the variable speed conveyor belt due to centrifugal force. More magnetic ferrous materials 24a, which generally are higher grade ferrous material, are carried around the end of variable speed conveyor belt and discharged separately. A waste fraction 32a may be produced to be disposed, sold at a lower value, or reprocessed to free bound metals and conveyed back through the system. The faster the speed at which the conveyor separator 26a operates the more material is likely to pass along with the less-ferrous middling material 28a and the waste fraction 32a, therefore adjusting the speed of the variable speed conveyor belt will balance the necessary centrifugal force experienced at the end of the conveyor separator 26a with the clean magnetic product desired.

Conveyor separators 26a are very effective in removing magnetic materials and depending on the adjusted speed of the variable speed conveyor belt, the magnetic fraction of ferrous materials 24a could represent 60% to 90% of the material it sorts (or 42% to 68% of the volume of the original material stream). Eliminating this large portion of the material flow from any substantial amount of manual sorting improves the quality of the finished ferrous product while reducing labor costs. An example of a pulley separator that would be suitable for this purpose is the Shred 1™ manufactured by Eriez Manufacturing, Co. An example of a pulley drum separator that would be suitable for this purpose is the PT Separator™ manufactured by Eriez Manufacturing, Co. An example of a dynamic pulley drum separator that would be suitable for this purpose is the Dynamic Drum Separator™ manufactured by Eriez Europe, Ltd.

Some conveyor separators 26a may include blowers to assist the removal of elements that are light (and therefore not metal) from the less-ferrous middling material 28a stream. A stream of air is blown onto the less-ferrous middling material 28a stream to help maintain a longer trajectory as they are ejected from the conveyor separator 26a. This helps to "clean" the less-ferrous middling material 28a stream of waste (fluff and fine dirt etc.) further providing an improved result. This waste then reports to the waste fraction 32a further benefitting the downstream hand sorting 20a step discussed in more detail herein. The capital cost and operating costs for such air systems are in the range of 20% to 30% of the prior art air cleaning tower 18 shown in FIG. 1 so an operator will see significant cost savings whether or not such a system is used. Again, the economic savings arises primarily due to the material stream 28a being only a fraction of the volume of the material stream 10 in the prior art.

The less-ferrous middling material 28a from the conveyor separator 26a is conveyed to the hand sorting 20a area. The less-ferrous middling material 28a stream represents only 10% to 40% of the original material stream 10a that has to be hand sorted (as compared to 70% to 75% of the initial material stream 10 under the prior art). This means that fewer workers are needed for manual sorting and that the error rate can be drastically reduced which in turn generates a cleaner final product which could be sold at higher prices.

Under the improved process, the hand sorting now removes composite materials 22a of ferrous and non-ferrous materials or simply waste 23a. The hand sorted composite materials 22a are either further shred to liberate the ferrous and non-ferrous fraction and further processed or are sold as a product or, if no market exists, are discarded. Furthermore, this final less-ferrous middling material 28a stream that can be a finished product after having composite materials 22a and waste 23a removed. This leads to better non-ferrous metals recovery that was in the past lost into the ferrous product (which decreases the ferrous product grade and lowers the volume of the non-ferrous metal collected). What was a contaminant under the prior art becomes a valued non-ferrous product in the improved process.

The process can be modified to include material detectors such as X-Ray or Gamma Ray Spectroscopes to measure and analyze the content of the material stream at various points, especially at the ferrous material 24a and the less-ferrous middling fraction 28a, to provide feedback or feed forward instructions to vary the speed of the conveyor separators 26a to fine-tune the processing of the material handling system. Such systems could also provide real-time analysis of the quality of the separated materials to better grade and price the sorted material stream.

Another embodiment of the improved process eliminates the hand sorting entirely. A basic outline of the process is presented in FIG. 3. As with the prior art, the material stream to be processed 10b is first run through a large shredder 12b that grinds, shreds, tears, or otherwise breaks the material down to a more manageable size. The shredded material stream 10b is conveyed to at least one drum separator 14b to remove the ferrous fraction from the material stream. The non-magnetic and non-ferrous materials in the removed material stream 16b are discharged out of the system for further processing and separation of valuable non-ferrous metals.

Figure 3:
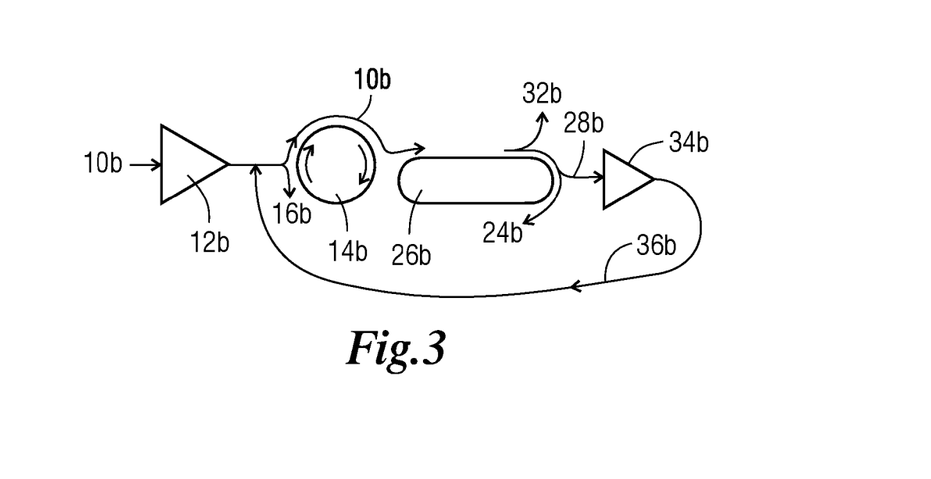
FIG. 3 is a flow chart showing an alternative embodiment of scrap metal processing according to the invention.

While all drum separator configurations can benefit from the improved process described herein, as with the embodiment described earlier, drum separators 14b that are equipped with technologies that generate larger magnetic fields are preferred for the same reasons described above. The material stream 10b discharged from the drum separator 14b is sent to a conveyor separator 26b for further processing. The conveyor separator 26b may be a pulley separator, a pulley drum separator, or a dynamic drum pulley separator. As with the earlier presented embodiment, less-ferrous middling material 28b, and/or composite material that does not contain enough magnetic material, is thrown off the variable speed conveyor belt due to centrifugal force. More magnetic ferrous materials 24b, are carried around the end of variable speed conveyor belt and discharged separately. A waste fraction 32b may be produced to be disposed, sold at a lower value, or reprocessed to free bound metals and conveyed back through the system. As with the earlier discussed embodiment, the magnetic fraction of ferrous materials 24b from the conveyor separator 26b could represent 60% to 90% of the material it sorts (or 42% to 68% of the volume of the original material stream).

The less-ferrous middling material 28b from the conveyor separator 26b is then conveyed to a second shredder 34b rather than being hand sorted. As this remaining material stream represents a small fraction of the initial material stream 10b (only 10% to 40% of the original material stream 10b), a smaller capacity second shredder 34b can be used instead of the larger shredder 12b at the beginning of the process. The size reduced material 36b from this second shredder 34b could then be dropped into the front of the process downstream of the first shredder 12b where recovery of the now liberated materials would occur. In addition to eliminating the laborious and error prone hand picking this process allows items that were either missed by the process the first time or that were combined into composite combinations of both ferrous and non-ferrous materials that could not be properly separated before to be separated into their respective fractions using the same separation process equipment already on hand. Therefore, after the economic decision is made to buy the second shredder 34b no new investment in separation equipment would be needed for this additional processing.

The process can be modified to include material detectors such as X-Ray or Gamma Ray Spectroscopes to measure and analyze the content of the material stream at various points, especially at the ferrous material 24b and the less-ferrous middling fraction 28b, to provide feedback or feed forward instructions to vary the speed of the conveyor separators 26b. Such systems could also provide real-time analysis of the quality of the separated materials to better grade and price the sorted material stream.

Another embodiment of the improved process stockpiles the non-ferrous material output and returns it back to the separator to be passed through the process for a second time. In this way any ferrous material 24c or waste material 32c that was missed the first time has another chance to be separated. A basic outline of the process is presented in FIG. 4. As with the prior art, the material stream to be processed 10c is first run through a large shredder 12c that grinds, shreds, tears, or otherwise breaks the material down to a more manageable size. The shredded material stream 10c is conveyed to at least one drum separator 14c to remove the ferrous fraction from the material stream. The non-magnetic and non-ferrous materials in the removed material stream 16c are discharged out of the system for further processing and separation of valuable non-ferrous metals.

Figure 4:
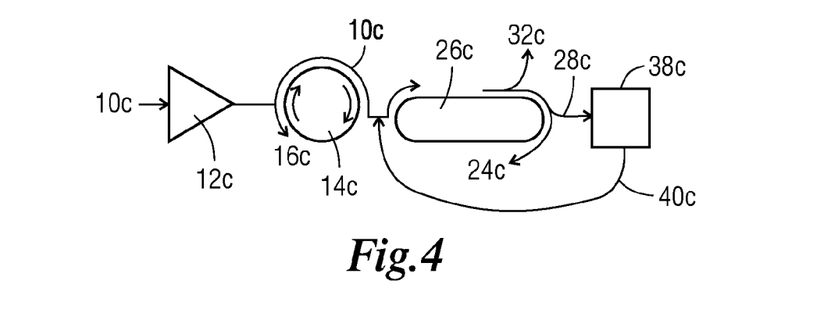
FIG. 4 is a flow chart showing an alternative embodiment of scrap metal processing according to the invention.

While all drum separator configurations can benefit from the improved process described herein, as with the earlier described embodiments, drum separators 14c that are equipped with technologies that generate larger magnetic fields are preferred for the same reasons described above. The material stream 10c discharged from the drum separator 14c is sent to a conveyor separator 26c for further processing. The conveyor separator 26c may be a pulley separator, a pulley drum separator, or a dynamic drum pulley separator. As with the earlier presented embodiments, less-ferrous middling material 28c, and/or composite material that does not contain enough magnetic material, is thrown off the variable speed conveyor belt due to centrifugal force. More magnetic ferrous materials 24c, are carried around the end of variable speed conveyor belt and discharged separately. A waste fraction 32c may be produced to be discarded, sold at a lower value, or reprocessed to free bound metals and passed back through the system.

In this embodiment, the less-ferrous middling material 28c is stockpiled 38c for reprocessing. The stockpile 38c is allowed to accumulate until a sufficient quantity is collected. The stockpile 38c is then returned 40c to the conveyor separator 26c for reprocessing. The conveyor separator 26c is run without any additional feed from the material stream 10c and at different machine settings (such as different conveyor speeds, different magnetic settings, etc.). This allows the less-ferrous middling material 28c to be more finely processed to recover any ferrous material that may have been missed in the first pass ultimately resulting in more magnetic ferrous material being separated from the non magnetic/non-ferrous material.

As with the earlier discussed embodiment, the magnetic fraction of ferrous materials 24c from the conveyor separator 26c could represent 60% to 90% of the material it sorts (or 42% to 68% of the volume of the original material stream). As has been stated above, less-ferrous middling material 28c contains a small percentage of ferrous material that was not captured in the first pass. Setting the conveyor separator 26c to operate at different settings allows items that were either missed by the process the first time or that could not be properly separated before to be separated into their respective fractions using the same separation process equipment already on hand. Therefore, except for inexpensive minimal stockpiling equipment, no new investment in separation equipment would be needed for this additional processing.

The process can be modified to include material detectors such as X-Ray or Gamma Ray Spectroscopes to measure and analyze the content of the material stream at various points, especially at the ferrous material 24c and the less-ferrous middling fraction 28c, to provide feedback or feed forward instructions to vary the speed of the conveyor separators 26c. Such systems could also provide real-time analysis of the quality of the separated materials to better grade and price the sorted material stream.

Another embodiment of the improved process presented improves the efficiency of the separation process by deploying an automated sorting device to further reduce the amount of hand sorting. A basic outline of the process is presented in FIG. 5. As with the prior art, the material stream to be processed 10d is first run through a large shredder 12d that grinds, shreds, tears, or otherwise breaks the material down to a more manageable size. The shredded material stream 10d is conveyed to at least one drum separator 14d to remove the ferrous fraction from the material stream. The non-magnetic, non-ferrous materials in the removed material stream 16d are discharged out of the system for further processing and separation of valuable non-ferrous metals.

Figure 5:
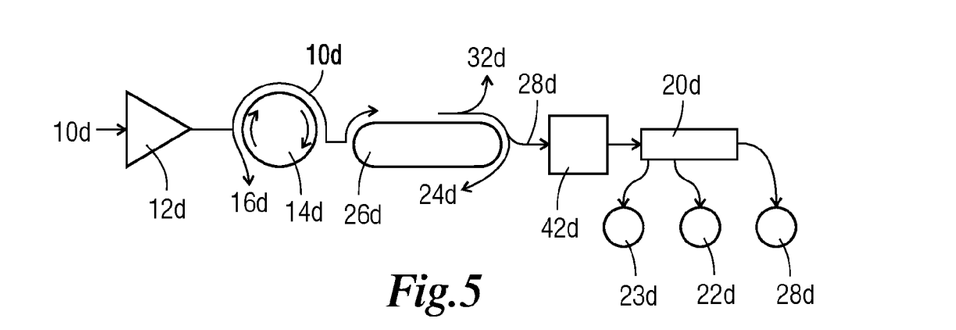
FIG. 5 is a flow chart showing an alternative embodiment of scrap metal processing according to the invention.

While all drum separator configurations can benefit from the improved process described herein, as with the earlier described embodiments, drum separators 14d that are equipped with technologies that generate larger magnetic fields are preferred for the same reasons described above. The material stream 10d discharged from the drum separator 14d is sent to a conveyor separator 26d for further processing. The conveyor separator 26d may be a pulley separator, a pulley drum separator, or a dynamic drum pulley separator. As with the earlier discussed embodiments, less-ferrous middling material 28d, and/or composite material that does not contain enough magnetic material, is thrown off the variable speed conveyor belt due to centrifugal force. More magnetic ferrous materials 24d, are carried around the end of variable speed conveyor belt and discharged separately. A waste fraction 32d may be produced to be disposed, sold at a lower value, or reprocessed to free bound metals and passed back through the system. As with the earlier discussed embodiment, the magnetic fraction of ferrous materials 24d from the conveyor separator 26d could represent 60% to 90% of the material it sorts (or 42% to 68% of the volume of the original material stream).

The less-ferrous middling material 28d from the conveyor separator 26d is then conveyed to a deployed automated sorter 42d for initial sorting and removal of certain material. The automated sorter 42d could be supplemented by material detectors such as X-Ray, X-Ray florescence, color, or a combination of sensor methods to measure and analyze the content of the less-ferrous middling material 28d stream prior to any secondary sorting in the hand sorting 20d area. In any case, the remaining material stream represents a very small fraction of the initial material stream 10d (only 5% to 10% of the original material stream 10d). Therefore a minimal amount of workers are needed for manual sorting and the error rate can be drastically reduced which generates a cleaner final product that could be sold at higher prices. Example of automated sorters 42d that would be suitable for this task are the XSS-F Separator manufactured by Steinert Elektromagnetbau GmbH and the X-Tract(r) XRF Separator manufactured by the Wendt Corporation.

Under the improved process, the hand sorting now removes composite materials 22d of ferrous and non-ferrous materials or simply waste 23d. The hand sorted composite materials 22d are either further shred to separate the ferrous and non-ferrous fraction and further processed or are sold as a product or if no market exist are discarded. Furthermore, this less-ferrous middling material 28d stream that can still be a finished product after having composite materials 22a and waste 23a removed. This leads to better non-ferrous metals recovery that was in the past lost into the ferrous product (which decreases the ferrous product grade and lowers the volume of the non-ferrous metal collected). What was a contaminant under the prior art becomes a valued non-ferrous product in the improved process.

The process can be modified to include material detectors such as X-Ray or Gamma Ray Spectroscopes to measure and analyze the content of the material stream at various points, especially at the ferrous material 24d and the less-ferrous middling fraction 28d, to provide feedback or feed forward instructions to vary the speed of the conveyor separators 26d. Such systems could also provide real-time analysis of the quality of the separated materials to better grade and price the sorted material stream.

Another embodiment of the improved process presented improves the efficiency of the separation process in applications in which the initial shredder is old and/or poorly performing or where by design a broad size distribution of shredded material is provided. A basic outline of the process is presented in FIG. 6. As with the prior art, the material stream to be processed 10e is first run through a large shredder 12e that grinds, shreds, tears, or otherwise breaks the material down to a more manageable size. In poorly performing shredders 12e the size range of the shredded material is wider than usual or expected. The shredded material stream 10e is conveyed to at least one drum separator 14e to remove the ferrous fraction from the material stream. The non-magnetic, non-ferrous materials in the removed material stream 16e are discharged out of the system for further processing and separation of valuable non-ferrous metals.

Figure 6:
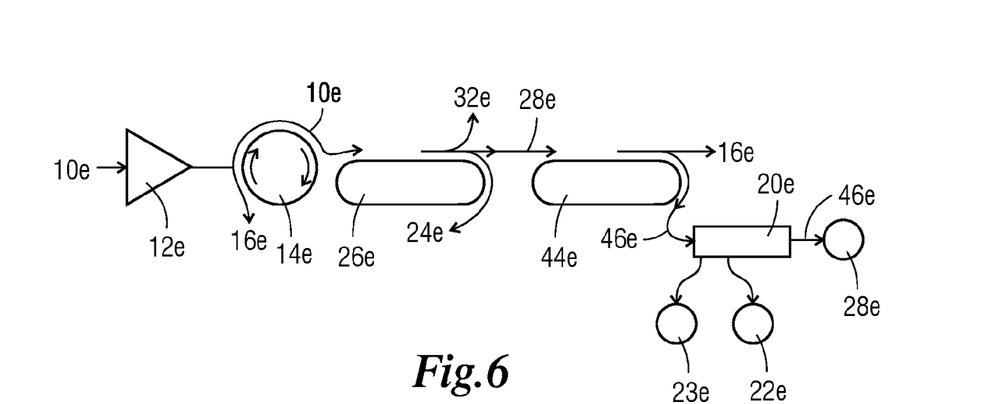
FIG. 6 is a flow chart showing an alternative embodiment of scrap metal processing according to the invention.

While all drum separator configurations can benefit from the improved process described herein, as with the earlier described embodiments, drum separators 14e that are equipped with technologies that generate larger magnetic fields are preferred for the same reasons described above. The material stream 10e discharged from the drum separator 14e is sent to a conveyor separator 26e for further processing. As with other embodiments presented above, the conveyor separator 26e may be a pulley separator, a pulley drum separator, or a dynamic drum pulley separator. As with the earlier discussed embodiments, less-ferrous middling material 28e, and/or composite material that does not contain enough magnetic material, is thrown off the variable speed conveyor belt due to centrifugal force. More magnetic ferrous materials 24e, which generally are higher grade ferrous material, are carried around the end of variable speed conveyor belt and discharged separately as a finished product. A waste fraction 32e may be produced to be disposed, sold at a lower value, or reprocessed to free bound metals and passed back through the system.

In systems with shredders 12e performing poorly, as presented earlier, the size range of the material 10e is larger. This gives rise to the situation in which the large pieces of material are outside the range that the conveyor separator 26e can effectively separate out. These larger pieces are usually a small percentage of the material stream 10e (likely less than 10%) and they can be high grade ferrous material but they report to the less-ferrous material 28e and are missed from the magnetic ferrous material 24e stream due solely to their larger size.

As presented earlier, the magnetic fraction of ferrous materials 24e from the conveyor separators 26e could represent 60% to 90% of the material it sorts (or a 42% to 68% of the volume of the original material stream). However, all separators perform better when the material they are processing falls within a narrower size distribution range. In systems with poorly performing shredders, the fraction of ferrous materials 24e would more likely represent less of the original material depending on the performance of the shredder 12e. In this embodiment, the less-ferrous middling material 28e is sent to a second conveyor separator 44e. The operator has the option sending along the waste fraction 32e to the second conveyor 44e for further processing. The second conveyor separator 44e is much smaller than the first conveyor separator 26e as it has to process only 10% to 40% of the volume of the material stream 10e.

The second conveyor separator 44e will be designed differently than the first separator 26a as it sort the coarser sized and less-ferrous middling material 28e and, if included by the operator, the waste fraction 32e from the first conveyor separator 26e into a non-ferrous fraction 16e (which is similar to the non-ferrous fraction sorted by the drum separators 14e earlier in the process and is handled similarly) and a ferrous fraction 46e (containing mostly the coarse ferrous missed by the first conveyor separator 26e and any composite materials that contain a composite of ferrous and other materials).

The ferrous fraction 46e from the second conveyor separator 44e is then conveyed to the hand sorting 20e area. This remaining ferrous fraction 46e material stream represents a yet smaller fraction of the initial material stream 10e (only 10% to 20% of the original material stream 10e). This means that fewer workers are needed for manual sorting and that the error rate can be drastically reduced which in turn generates a cleaner final product which could be sold at higher prices.

Under the improved process, the hand sorting now removes composite materials 22e of ferrous and non-ferrous materials or any waste 23e that has been missed through the additional sorting from the second conveyor separator 44e in this embodiment. The hand sorted composite materials 22e are further shred to liberate the ferrous and non-ferrous fraction and further processed, or are sold as a product, or, if no market exist, are discarded. The remainder of the ferrous fraction 46e is processed and sold as another product or blended with higher quality ferrous materials 24e as the operator decides. The non-ferrous fraction 16e from the drum separators 14e and the second conveyor separator 44e can be further processed with a scavenger magnet (not shown) to recover any lost ferrous material which would be returned to the drum separators 14e for processing.

The process can be modified to include material detectors such as X-Ray or Gamma Ray Spectroscopes to measure and analyze the content of the material stream at various points, especially at the ferrous material 24e and the ferrous fraction 46e steps, to provide feedback or feed forward instructions to vary the speed of the first conveyor separators 26e and/or the second conveyor separator 44e to fine-tune the quality of the material handling system. Such systems could also provide real-time analysis of the quality of the separated materials to better grade and price the sorted material stream.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

What is claimed is:

1. A process for scrap metal processing for shredding and sorting recoverable material from a material stream comprising a ferrous fraction, a non-ferrous fraction, a waste fraction and a less ferrous fraction that includes composite materials, comprising:
    shredding the material stream with a first shredder to a size that enables downstream processing;
    conveying the material stream to at least one drum separator to remove the non-ferrous fraction from the material stream; and
    conveying the material stream from the at least one drum separator to a first conveyor separator to separate the ferrous fraction and the waste fraction from the material stream.

2. The process of claim 1 further comprising conveying the material stream from the first conveyor separator to a hand sorting stage to sort the material stream into its remaining component fractions.

3. The process of claim 1 further comprising:
    shredding the material stream from the first conveyor separator with a second shredder; and
    returning the material stream to the at least one drum separator for reprocessing.

4. The process of claim 1 further comprising:
    stockpiling the material stream from the first conveyor separator; and
    returning the stockpiled material stream to the first conveyor separator for reprocessing at different settings.

5. The process of claim 1 further comprising:
    conveying the material stream from the first conveyor separator to an automated sorter for preliminary sorting of the material stream; and
    conveying the material stream from the automated sorter to a hand sorting stage to sort the material stream into its remaining component fractions.

6. The process of claim 1 further comprising:
    conveying the material stream from the first conveyor separator to a second conveyor separator to further separate the non-ferrous fraction from the material stream; and
    conveying the remaining material stream from the second conveyor to a hand sorting stage to sort the material stream into its remaining component fractions.

7. The process of claim 1 in which the first conveyor separator is a pulley separator, a pulley drum separator, or a dynamic drum pulley separator.

8. The process of claim 1 further comprising:
    conveying the material stream from the first conveyor separator to a second conveyor separator,
    the second conveyor separator is a pulley separator, a pulley drum separator, or a dynamic drum pulley separator, the second conveyor to further separate the non-ferrous fraction from the material stream; and conveying the remaining material stream from the second conveyor to a hand sorting stage to sort the material stream into its remaining component fractions.

9. The process of claim 1 in which material detectors are used to adjust the first conveyor separator.

10. The process of claim 1 further comprising:
conveying the material stream from the first conveyor separator to a hand sorting stage to sort the material stream into its remaining component fractions; and
shredding the hand sorted composite fraction of the material stream with a second shredder.

11. The process of claim 1 further comprising conveying the material stream through an air cleaning tower.

12. The process of claim 1 wherein the first conveyor comprising a blower.

13. The process of claim 1 wherein the first conveyor comprising a blower to assist in the removal of the non-ferrous fraction.

14. The process of claim 1 further comprising:
conveying the material stream from the first conveyor separator to a second conveyor separator,
the second conveyor separator is a pulley separator, a pulley drum separator, or a dynamic drum pulley separator, the second conveyor to further separate the non-ferrous fraction from the material stream;
the second conveyor separator having a blower; and
conveying the remaining material stream from the second conveyor to a hand sorting stage to sort the material stream into its remaining component fractions.

15. The process of claim 1 further comprising:
conveying the material stream from the first conveyor separator to a second conveyor separator,
the second conveyor separator is a pulley separator, a pulley drum separator, or a dynamic drum pulley separator, the second conveyor to further separate the non-ferrous fraction from the material stream;
the second conveyor separator having a blower to assist in the removal of the non-ferrous fraction; and
conveying the remaining material stream from the second conveyor to a hand sorting stage to sort the material stream into its remaining component fractions.

* * * * *